United States Patent
Lund et al.

(10) Patent No.: US 6,176,948 B1
(45) Date of Patent: Jan. 23, 2001

(54) METHOD FOR THE MANUFACTURE OF COMPONENTS MADE OF STEEL

(75) Inventors: Thore Lund; Staffan Larsson; Patrik Ölund, all of Hofors (SE)

(73) Assignee: Ovako Steel AB, Hofors (SE)

(*) Notice: Under 35 U.S.C. 154(b), the term of this patent shall be extended for 0 days.

(21) Appl. No.: 09/268,651

(22) Filed: Mar. 16, 1999

(30) Foreign Application Priority Data

Mar. 16, 1998 (SE) .................................... 9800859

(51) Int. Cl.[7] .................................... C21D 8/00
(52) U.S. Cl. ............................ 148/654; 148/906
(58) Field of Search .................... 148/906, 654, 148/663, 660

(56) References Cited

U.S. PATENT DOCUMENTS

| | | | |
|---|---|---|---|
| 3,369,942 | * 2/1964 | Bamberger | 148/906 |
| 4,088,511 | 5/1978 | Rowney . | |
| 4,957,702 | 9/1990 | Fang et al. . | |
| 4,973,368 | * 11/1990 | Lund . | |
| 5,290,508 | 3/1994 | Kobayashi et al. . | |
| 5,409,554 | 4/1995 | Leap . | |
| 5,672,217 | 9/1997 | Hengerer et al. . | |
| 5,783,314 | 7/1998 | Yamagiwa et al. . | |

FOREIGN PATENT DOCUMENTS

| | | | |
|---|---|---|---|
| 0 543 010 A1 | * 5/1993 | (EP) . | |
| 0 643 142 | 3/1995 | (EP) . | |
| 0 794 321 | 9/1997 | (EP) . | |
| 1 361 553 | 7/1974 | (GB) . | |
| 2 232 684 | 12/1990 | (GB) . | |

* cited by examiner

*Primary Examiner*—Deborah Yee
(74) *Attorney, Agent, or Firm*—Burns, Doane, Swecker & Mathis, L.L.P.

(57) ABSTRACT

A method for the manufacture of components made of steel subject to heavy stress, load and/or wear, such as rolling bearing elements, hot forming components of a steel having an austenite carbon content at a hot forming temperature of about 800–1100° C. of 0.55–0.85 wt %, above the Al temperature of the steel;

hardening the components directly from the hot forming temperature in air;

hard machining of the components to their final dimensions; and surface finishing the components.

6 Claims, 1 Drawing Sheet

METHOD FOR THE MANUFACTURE OF COMPONENTS MADE OF STEEL

BACKGROUND OF THE INVENTION

The invention relates to a method for the manufacture of components made of steel for use under heavy stress, load and/or wear, such as rolling bearing elements.

Normally, components such as rolling bearing elements are manufactured from a steel with 1% by weight C. The steel is heated to a temperature of about 1100° C. and is given its form in a hot forming step. It is then allowed to cool in air. Next, the steel is soft annealed, then soft machined, thereafter hardened by quenching from 850° C. in oil or salt, and then ground and surface finished. After this, the element can be assembled with other elements. The most costly part of this manufacturing method is the grinding step. Even if the components have their intended final dimensions and tolerances after the soft machining step, the hardening step will cause distortion of the component, and a large share of the total costs can be incurred in the grinding step.

Further, the components are heated to high temperatures at least twice after the hot forming treatment resulting in a high energy consumption. The process is also time consuming, and because of the quenching step, this known process also creates environmental problems and fire hazards.

SE-C-467 829 discloses a method of producing components from steel with an eutectoidal composition, according to which a blank is formed at a temperature just above the Al temperature of the steel to a shape at least approximately having the final dimensions, whereupon the hot formed component is hardened directly from the hot forming temperature. According to the preferred embodiment, no soft annealing step is performed before the heating to the hot forming temperature. The hot forming is a semi-hot forming process, which is performed at 750°–850° C., and the component is quenched in oil directly from the hot forming temperature, resulting in a sufficient hardness.

An important advantage with this process is that the time consuming, costly and complicated soft annealing process can be deleted, but still there is a need for further improvement of this process.

OBJECTS AND SUMMARY OF THE INVENTION

It is an object of this invention to avoid or alleviate the problems of the prior art.

It is further an object of this invention to eliminate the above discussed disadvantages, and to provide a method for the manufacture of components made of steel to be used under heavy stress, load and wear, at reduced cost, with lower energy consumption, shorter flow time, more environmentally friendly and more safely, compared to the prior art.

It is an aspect of the invention to provide a method for the manufacture of components made of steel subject to heavy stress, load and/or wear, such as rolling bearing elements comprising:

hot forming components of a steel having an austenite carbon content at a hot forming temperature of about 800–1100° C. of 0.55–0.85 wt %, above the Al temperature of the steel;

hardening the components directly from the hot forming temperature in air;

hard machining of the components to their final dimensions; and surface finishing the components.

BRIEF DESCRIPTION OF THE DRAWINGS

The invention will now be described more in detail with the aid of an example and with reference to the accompanying drawing, in which The Figure illustrates the hardness distribution in a ring section, true size, produced with the method according to the invention.

DETAILED DESCRIPTION OF THE PREFERRED EMBODIMENTS OF THE INVENTION

Figure 1:
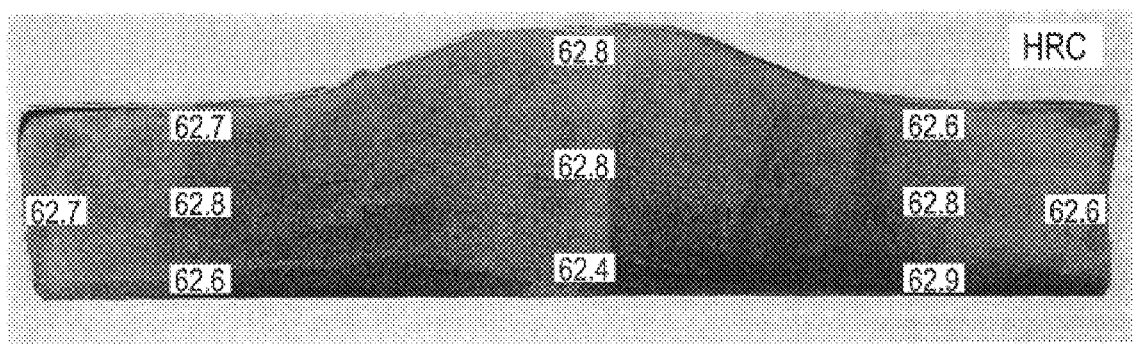

By using the heat from the hot forming step in the hardening step, substantial energy savings are achieved. Hard machining is performed after hardening of the component, and since no hardening takes place after the component has received its final dimensions, little or no grinding is needed, leading to substantial savings in time and cost. A further important advantage is that the conventional quenching step is eliminated, and accordingly, environmental and safety risks are eliminated.

The carbon content in relation to the rest of the alloying components of the steel is to be adjusted such that the solute carbon concentration in the austenite at the hot forming step is 0.55–0.85% by weight. With this provision, the components will not crack, and they will be through hardened in the air cooling step.

In the method according to the invention, the steel must be designed to give a proper austenite carbon content at hot forming temperature. A too high content of dissolved carbon will lead to quench cracking. Further, the hardenability of the steel must be made such that the ring section through hardens when given a very mild and slow quench, as in air. These characteristics can be adjusted according to conventional techniques well-known to the skilled artisan.

The invention is additionally illustrated in connection with the following Example which is to be considered as illustrative of the present invention. It should be understood, however, that the invention is not limited to the specific details of the Example.

EXAMPLE

Process

The aim was to directly through harden rings (9 kg/pc) after hot rolling. The forging temperature was at the start approximately 1100° C. and had decreased to approximately 850° C. in the final forming step. The rings were subjected to a slightly forced air-cooling on a conveyor belt. When the rings had reached room temperature, they were post-quenched to a temperature of 5° C. After this, the rings were tempered at 150° C. for 1 hour.

Subsequently, the rings were hard machined and subjected to a surface finishing operation.

Chemical Composition of Material

The composition was optimized to obtain equal or improved properties, with a mild quenching from forging temperature, compared to a traditionally processed AISI 52100 steel component (>60 HRC through the section and approximately 15% retained austenite). Since at forging temperature, all the alloying elements are in solid solution, the following considerations were made:

0.66 wt % C—The carbon content must be low enough to avoid quench cracking and excessive amount of retained austenite but high enough to achieve the desired hardness level.

1.45 wt % Si—The silicon content was chosen to be relatively high to increase the hardenability without influencing too much the Ms-temperature and to suppress the retained austenite decomposition and cementite precipitation. Hence, the hardened and tempered structure will be thermally stable and thus less prone to softening due to thermal exposure.

0.28 wt % Mn—A normal level compared to, e.g., AISI 52100. Manganese was considered to lower the Ms-temperature too much compared to the gain in hardenability (influence on the pearlite and bainite transformation).

1.51 wt % Cr—A normal level compared to, e.g., AISI 52100. The chromium will increase the hardenability.

1.03 wt % Ni—A nickel addition will significantly increase the hardenability. Furthermore, it will positively influence the toughness of the martensite.

0.23 wt % Mo—Strongly increases the hardenability, especially pearlite transformation.

Hardness and Structure

The achieved hardness was 62.5 HRC and uniform through the ring section, see the Figure. The structure was martensite with approximately 15% retained austenite.

Discussion

The Table shows the properties of a product made from the new processing route with the new material compared to a traditional martensitic AISI 52100 component.

TABLE

Properties of a component processed with new processing route and optimized steel compared to traditionally martensite hardened AISI 52100 steel components.

| | Hardness After Tempering (150° C.) | Toughness | Structural Stability | Maximum Operating Temperature | Property of Maintaining Hardness After Long Service Times |
|---|---|---|---|---|---|
| New | equal | equal | higher | higher | higher |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for the manufacture of components made of steel subject to heavy stress, load and/or wear, such as rolling bearing elements comprising:

hot forming components of a steel having an austenite carbon content at a hot forming temperature of about 800–1100° C. of 0.55–0.85 wt %, above the Al temperature of the steel;

hardening the components directly from the hot forming temperature in air;

hard machining of the components to their final dimensions; and surface finishing the components.

2. The method of claim 1 utilizing a steel having a composition of greater than 0.55% C, 0–2% Si, 0–2% Mn, 0–20% Cr, 0–5% Ni, 0–3% Mo and 0–1% V and/or Nb.

3. The method of claim 1 wherein hardening is conducted in air provided by forced convection with the addition of water.

4. The method of claim 1, wherein said steel is provided with a composition comprising:

0.66 wt. % C;
   1.45 wt. % Si;
   0.28 wt. % Mn;
   1.51 wt. % Cr;
   1.03 wt. % Ni; and
   0.23 wt. % Mo.

5. The method of claim 1, wherein the hot forming step comprises a plurality of hot rolling steps, the temperature at the start of the hot rolling is approximately 1100° C., and the temperature at the final forming step is approximately 850° C.

6. The method of claim 1, further comprising tempering the components after the hardening step at approximately 150° C. for 1 hour.

* * * * *